United States Patent [19]

Yamaguchi et al.

[11] Patent Number: 4,872,184

[45] Date of Patent: Oct. 3, 1989

[54] DIGITAL AUTOMATIC LINE EQUALIZER WITH MEANS FOR CONTROLLING TAP GAINS OF TRANSVERSAL FILTER BASED ON MEAN POWER OF OUTPUT FROM THE FILTER

[75] Inventors: Masaru Yamaguchi, Tokyo; Takenori Ogata, Miyagi, both of Japan

[73] Assignee: NEC Corporation, Tokyo, Japan

[21] Appl. No.: 222,482

[22] Filed: Jul. 21, 1988

[30] Foreign Application Priority Data

Jul. 21, 1987 [JP] Japan ............................... 62-180105
Jul. 21, 1987 [JP] Japan ............................... 62-180106
Feb. 29, 1988 [JP] Japan ................................. 63-46106

[51] Int. Cl.$^4$ .............................................. H04B 3/04
[52] U.S. Cl. .................................... 375/14; 364/724.2
[58] Field of Search ...................... 375/12, 14; 333/18; 364/724.16, 724.2, 758

[56] References Cited

U.S. PATENT DOCUMENTS 3,537,038 10/1970 Rich ....................................... 375/14
3,736,414 5/1973 McAuliffe ............................. 375/14
4,071,827 1/1978 Koike et al. .......................... 375/12
4,141,072 2/1979 Perreault ................................ 375/12

Primary Examiner—Benedict V. Safourek
Attorney, Agent, or Firm—Sughrue, Mion, Zinn, Macpeak & Seas

[57] ABSTRACT

A digital automatic line equalizer for compensating distortion of a digital signal transmitted through a transmission line comprises a transversal filter having a set of tap gains for producing an equalized signal as a filter output from the digital signal incoming thereto. A first multiplier squares a current one of the filter output to produce a squared signal and other multipliers multiply the current and the previous ones of the filter outputs to produce product signals. In a calculator, the product signals are weighted and are, thereafter, summed together with the squared signal to produce summed signals which are averaged for a predetermined time duration into a mean value. A controller has a plurality of sets of values for the set of tap gains, compares the mean value with a reference value to produce an error signal and determines one set of the plurality of sets of values in response to the error signal to make the set of tap gains equal to the set of values thereby to maintain the mean value to the reference value so that the transversal filter produces the equalized signal.

7 Claims, 4 Drawing Sheets

DIGITAL AUTOMATIC LINE EQUALIZER WITH MEANS FOR CONTROLLING TAP GAINS OF TRANSVERSAL FILTER BASED ON MEAN POWER OF OUTPUT FROM THE FILTER

BACKGROUND OF THE INVENTION (1) Field of the Invention

The present invention relates to automatic line equalizers, and, in particular, to such automatic line equalizers of a digital type.

(2) Description of the Prior Art

In a digital communication system, a digital transmission signal suffers from distortion and/or loss during transmission through a transmission line, the distortion and/or loss causing inter-symbol interference. In order to compensate such distortion and/or loss, a repeator or a receiver is provided with an automatic line equalizer.

A known automatic line equalizer comprises an automatic line-build-out (ALBO) network, a fixed equalizer coupled to the ALBO, and a peak detecting circuit at an output of the equalizer, as shown in "Local Distribution System" written by Bender et al, THE BELL SYSTEM TECHNICAL JOURNAL, MAY-JUNE 1975, VOL. 54 NO. 5, pages 919–942 (Reference 1). The peak of an equalized signal from the equalizer is detected by the peak detecting circuit, and the ALBO is controlled by the detected peak signal to match the equalizer.

However, the ALBO, the equalizer, and the peak detecting circuit are constituted by analog circuits and are therefore difficult in formation on a single large-scaled integrated circuit (LSI) of modest size.

Another known automatic line equalizer is, so called, a Decision Feedback Equalizer (DFE) which comprises a transversal filter having a plurality of tap gains. The transversal filter delivers sampled pulses which are decided at a decision circuit to produce decided pulses. The characteristic of the transmission line is estimated from the decided pulses at a control circuit to thereby control the plurality of tap gains. Thus, the transversal filter produces an equalized signal as an output of the filter. Reference is made to "Automatic Equalization for Digital Communication" by Lucky, THE BELL SYSTEM TECHNICAL JOURNAL, APRIL 1965, VOL. 44 NO. 4, page 547 (Reference 2).

The DFE can be implemented as a digital circuit and therefore can be contained on an LSI. However, since the estimation of the transmission line characteristic is based on the decided signal, equalization cannot be realized when the decided signal is not substantially or approximately equal to a transmission signal sent out to the transmission line.

SUMMARY OF THE INVENTION

It is an object of the present invention to provide a digital automatic line equalizer which can readily effect line equalization without use of the decided signal.

As mentioned in the preamble, a digital automatic line equalizer is used in a receiving side of a digital signal transmitted through a transmission line in a digital communication system, and comprises a transversal filter responsive to the digital signal for producing a filter output of sampled pulses. The transversal filter has a plurality of tap gains controlled by control means so as to produce an equalized signal as the filter output. According to the present invention, the digital automatic line equalizer comprises first multiplying means coupled to the transversal filter and responsive to a current one of the filter output for squaring the current filter output to produce a first multiplied signal, means coupled to the transversal filter for temporarily holding the filter output as a held signal, second multiplying means coupled to the transversal filter and the holding means and responsive to the current filter output for multiplying the held signal and the current filter output to produce a second multiplied signal, calculating means coupled to the first and the second multiplying means for calculating from the first and the second multiplied signals a mean power of sum of the first multiplied signal and the second multiplied signal weighed by weight to produce a mean power signal, and the control means coupled to the calculating means and responsive to the mean power signal for determining a set of values of the tap gains as a set of determined values on the base of the mean power signal to control the tap gains to be the set of determined values so that the transversal filter produces the equalized signal with the mean power being equal to a predetermined value.

In a digital communication system using a partial response code signal as the digital signal, the digital automatic equalizer further comprises a partial response filter coupled with an input side of the transversal filter for filtering the digital signal to apply the partial response code signal to the transversal filter.

In one aspect of the present invention, the holding means comprises an l-stage (l being a natural number) shift register for time-sequentially shifting the sampled pulses of the filter output from one stage to next subsequent stage to temporarily hold subsequent l sampled pulses as the held signal, the subsequent l sampled pulses held in the l stages being delivered from the stages as a set of parallel signals, the second multiplying means comprising a plurality of (l) multipliers coupled to the l stages of the shift register, respectively, for multiplying the current filter signal and the parallel signals, respectively, to produce a set of l product signals as the second multiplied signal.

The calculating means may comprise a plurality of (l) weighing circuits coupled to the l multipliers, respectively, for weighing predetermined weight factors the l product signals to form l weighed product signals, an adder coupled to the first multiplying means and the l weighing circuits for adding the first multiplied signal and the l weighed product signals together to produce an added signal, and an averaging circuit coupled to the adder for averaging the added signal for a predetermined time duration to produce the mean power signal.

In modifications of the calculating means, a plurality of averagers can be used at a stage previous to the adder or at a further previous stage of weighing circuits in place of a single averager used at an output side of the adder.

The control means may comprise a reference value setting means for storing the predetermined value as a reference value, comparing means responsive to the mean power signal for comparing the mean power signal and the reference value to produce an error signal, selection control means responsive to the error signal for producing a selection signal, and memory means for storing a plurality of sets of values for the tap gains, the memory means selecting, as the set of determined values, one set from a plurality of sets of values in response to the selection signal to deliver the set of determined values to the transversal filter so as to control the tap gains.

DESCRIPTION OF PREFERRED EMBODIMENTS

Figure 1:
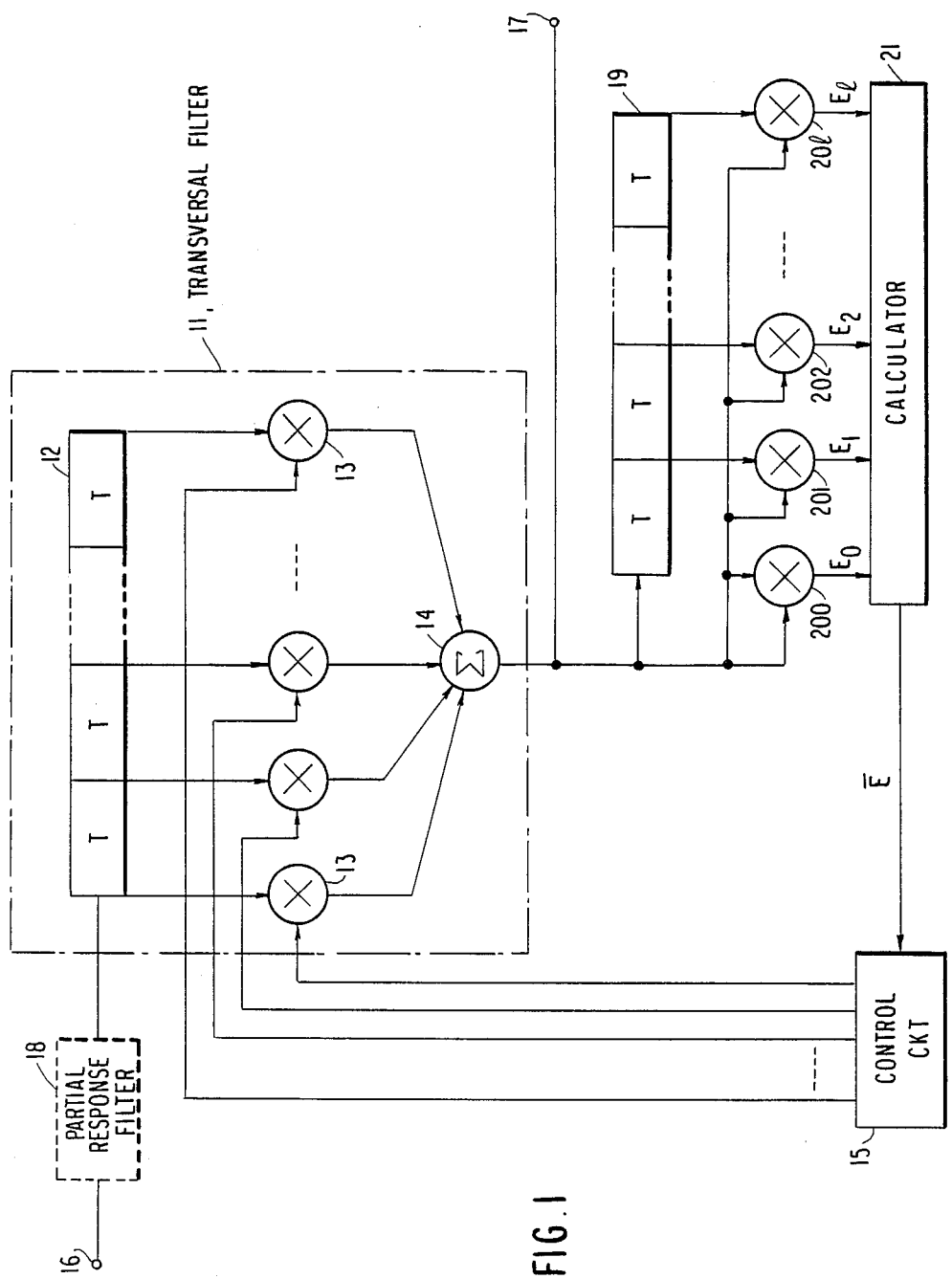
FIG. 1 is a block diagram view illustrating an automatic line equalizer according to an embodiment of the present invention.

Referring to FIG. 1, an automatic line equalizer shown therein comprises a transversal filter 11 comprising a tapped delay line 12, a plurality of multipliers 13 connected to the taps, respectively, for determining tap gains, and an adder 14 for adding outputs from the multipliers 13 to produce a filter output. The automatic line equalizer has a control circuit 15 for controlling the tap gains.

A transmission signal transmitted through a transmission line is applied to the transversal filter 11 through an input terminal 16 and is equalized at the transversal filter 11 having tap gains controlled by the control circuit 15 to produce an equalized and sampled signal at an output terminal 17 of the transversal filter 11. The equalized signal is applied to a decision circuit (not shown) and is decided thereat.

In the DFE, the control circuit controls the tap gains on the base of the decided signal as described in the preamble of the description.

According to the present invention, the tap gains are controlled without use of the decided signal but in a manner as described below.

Prior to description of circuits of the embodiment, description will now be made as to principle of the manner for controlling the tap gains of the transversal filter.

Now, providing that transmission data represented by $a_n$ are transmitted as a base band signal with a baud rate to the input terminal 16 through a transmission line and that h(t) represents an impulse response of the transmission line, it is known in the prior art that a sample value $r_{k,\tau}$ of the data at the input terminal at a time instant of $kT+\tau$ is given by the following equation (1):

$$r_{k,\tau} = \sum_n a_n \cdot h_{k-n,\tau} \quad (1)$$

where T represents an inverse of the baud rate and is corresponding to a sampling interval, $\tau$ being a sampling phase ($0 \leq \tau \leq T$), k being a natural number, and $h_{k,\tau} = h(kT+\tau)$. In this connection, $h_{k-n,\tau}$ and therefore $r_{k,\tau}$ are functions of the sampling phase $\tau$ and the length of the transmission line.

Now, considering $E_0$, $E_1$, ..., $E_l$, and E given by the following equations (2), (3), (4), and (5):

$$E_0 = r_{k,\tau} \cdot r_{k,\tau} \quad (2)$$
$$E_1 = r_{k,\tau} \cdot r_{k-1,\tau} \quad (3)$$
$$E_l = r_{k,\tau} \cdot r_{k-l,\tau} \quad (4)$$
$$E = E_0 + p_1 E_1 + p_2 E_2 + \ldots + p_l E_l \quad (5)$$

where $p_1, p_2, \ldots$, and $p_l$ represent constants and l is a natural number, the present inventors appreciated by a computer simulation technique a fact that proper selection of values of $p_1, p_2, \ldots$, and $p_l$ can make E constant in no relation to the sampling phase $\tau$, for a given transmission line length.

Figure 2A:
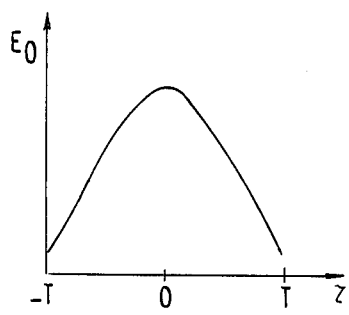
FIGS. 2a to 2c show waveforms of $E_0$, $E_1$, and E given by equations (2), (3), and (5), respectively.
Figure 2B:
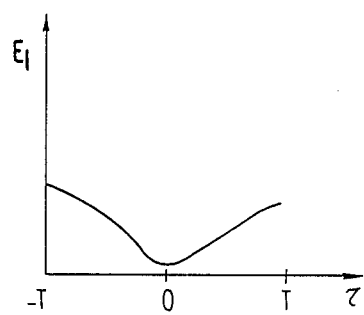
Figure 2C:
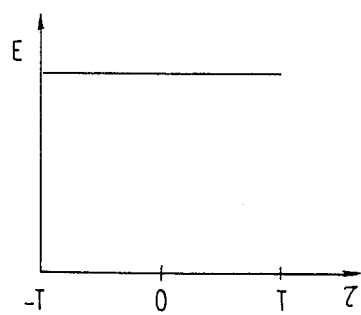

As a simple example, FIGS. 2a to 2c show waveforms of $E_0$, $E_1$, and E, respectively, for l=1.

Figure 3:
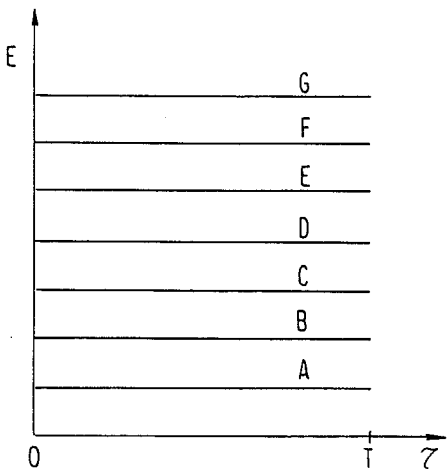
FIG. 3 shows variation of E in response to variation of transmission line length.

It was also appreciated by the computer simulation technique that E varies in response to variation of the transmission line length as shown in FIG. 3. In the figure, lines A, B, C, D, E, F, and G indicate values of E for line lengths of 1 km, 2 km, 3 km, 4 km, 5 km, 6 km, and 7 km, respectively.

Considering means value ($\overline{E}$) of E for a comparatively long time duration such as several or more sampling time intervals, $\overline{E}$ is given by:

$$\overline{E} = \overline{E}_0 + p_1 \overline{E}_1 + p_2 \overline{E}_2 + \ldots + p_l \overline{E}_l \quad (6)$$

It was also confirmed that $\overline{E}$ is constant for a given line length in no relation with the sampling phase $\tau$.

This teaches us that it is possible to control the tap gains of the transversal filter 11 on the base of $\overline{E}$ calculated from the filter output so as to make $\overline{E}$ equal to a predetermined reference value $E_r$. Thus, the transversal filter can be controlled to have a characteristic reversed to a characteristic of the transmission line and can equalize a signal received through the transmission line. That is, it is possible to compensate the distortion and/or loss of the signal during transmission through the transmission line and to cancel the inter-symbol interference.

Returning to FIG. 1, the automatic line equalizer further comprises an l-stage shift register 19, a plurality of (l+1) multipliers 200 through 20l (collectively represented by 20) and a calculator 21 for obtaining $\overline{E}$ which is given by equation (6).

The filter output of the transversal filter 11 is applied to the shift register 19 and is serially shifted from one stage to the next subsequent stage therein. Those stages deliver their own holding signals to multipliers 201 through 20l, respectively. On the other hand, the filter output is applied to two input terminals of the multiplier 200 and is also applied to one input terminal of each one of the other multipliers 201 through 20l. That is, the multiplier 200 squares a current one of the filter output signal to produce a squared signal, while each of the other multipliers 201-20l multiplies the current filter output and previous one of the filter output to produce a product signal.

Now, providing that the filter output is represented by equation (1), outputs of multipliers 200 through 20l are represented by $E_0, E_1, \ldots,$ and $E_l$, respectively, which are given by equations (2) through (4).

The calculator 21 calculates the mean value $\overline{E}$ given by equation (6) from $E_0, E_1, \ldots,$ and $E_l$. The calculated $\overline{E}$ is applied to the control circuit 15.

The control circuit 15 determines the values of tap gains of the transversal filter 11 on the base of the calculated $\overline{E}$ so as to make $\overline{E}$ equal to a predetermined reference value $E_r$ and delivers the tap gain values to the multipliers 13, respectively, to control the tap gains. Thus, the transversal filter 11 produces an equalized signal as the filter output and $\overline{E}$ is maintained to be $E_r$.

Figure 4:
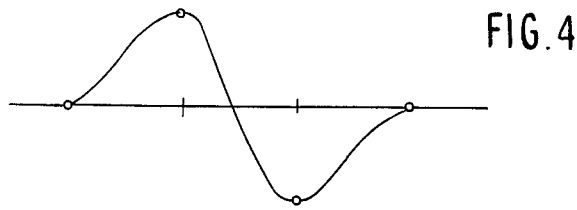
FIG. 4 shows a waveform of a partial response code signal.

It will be understood that a condition of $\overline{E}$=constant is realized for not only the full response code signal such as the bipolar signal but also partial response code signal such as the duobinary signal as the transmission signal. In application to equalization of the transmission signal of the partial response code, a partial response filter (shown by a dotted line block at 18 in FIG. 1) is used before the transversal filter 11. FIG. 4 shows a signal waveform of the duobinary signal at an output side of the partial response filter 18. A response of E similar to FIG. 3 was appreciated for the partial response code signal as the transmission signal by the computer simulation technique.

It is needless to say that a clock signal for controlling delay line 12, the shift register 19 and others can be extracted from the filter output by a known timing extracting circuit.

Figure 5:
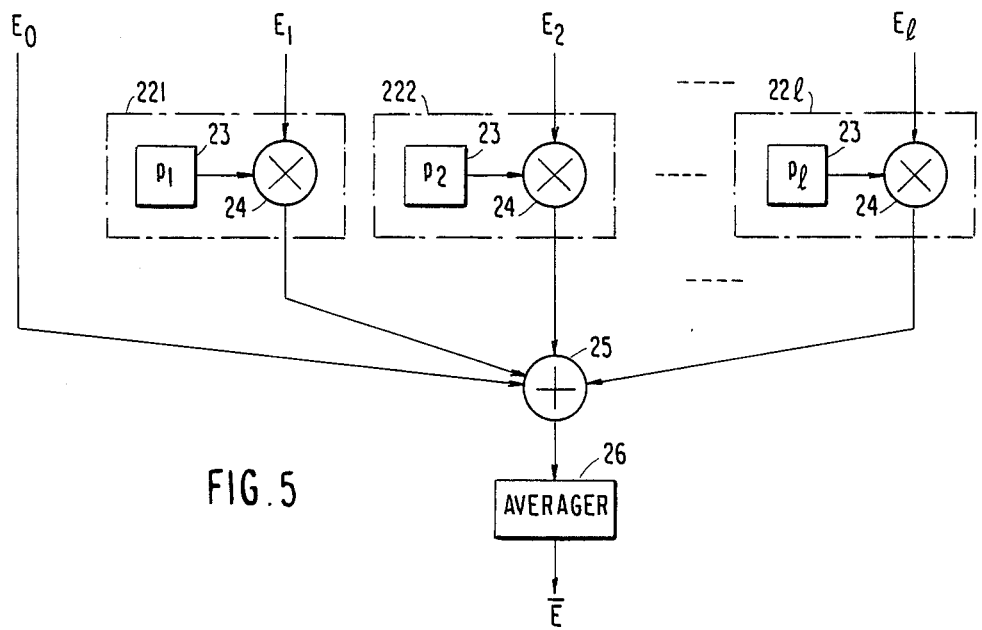
FIG. 5 is a block diagram view illustrating an example of a calculator in FIG. 1.

Referring to FIG. 5, an example of the calculator 21 is shown therein which comprises a plurality of (l) weighing circuits 221 through 22l (which are collectively represented by 22) for multiplying product signals $E_1, E_2, \ldots,$ and $E_l$ and constants or coefficients $p_1, p_2, \ldots,$ and $p_l$ to produce weighed signals $p_1E_1, p_2E_2, \ldots,$ and $p_lE_l$, respectively.

Each of weighing circuits 22 comprises a coefficient producing circuit 23 for producing a corresponding one of the constants or coefficients $p_1, p_2, \ldots,$ and $p_l$ and a multiplier 24 for multiplying the coefficient and a corresponding one of product signals $E_1, E_2, \ldots,$ and $E_l$.

The calculator 21 further comprises an adder 25 for adding the signals $E_0, p_1E_1, p_2E_2, \ldots,$ and $p_lE_l$ together to produce E given by equation (5) and an averager 26 for averaging E for a predetermined time duration such as several or more sampling intervals to produce a mean value $\overline{E}$ given by equation (6). As the averager 26, an integrator is used as known in the prior art.

Figure 6:
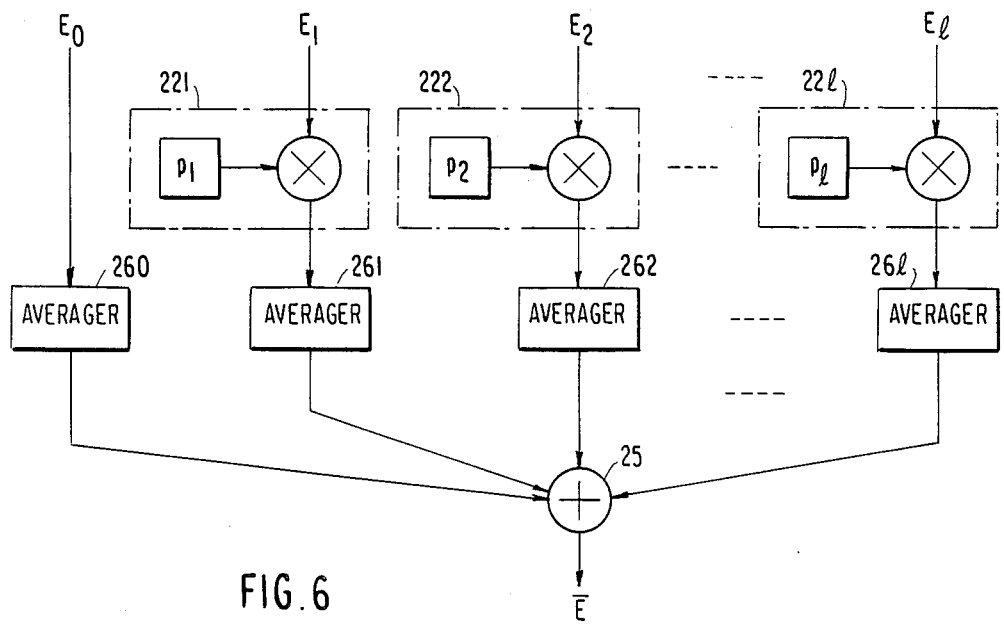
FIG. 6 is a block diagram view illustrating another example of the calculator.

Referring to FIG. 6 illustrating a modification of the calculator 21, a plurality of (l+1) averagers 260 through 26l are used before the adder 25 for averaging $E_0, p_1E_1, p_2E_2, \ldots,$ and $p_lE_l$, respectively, which are thereafter added at the adder 25 to produce the mean value $\overline{E}$.

Figure 7:
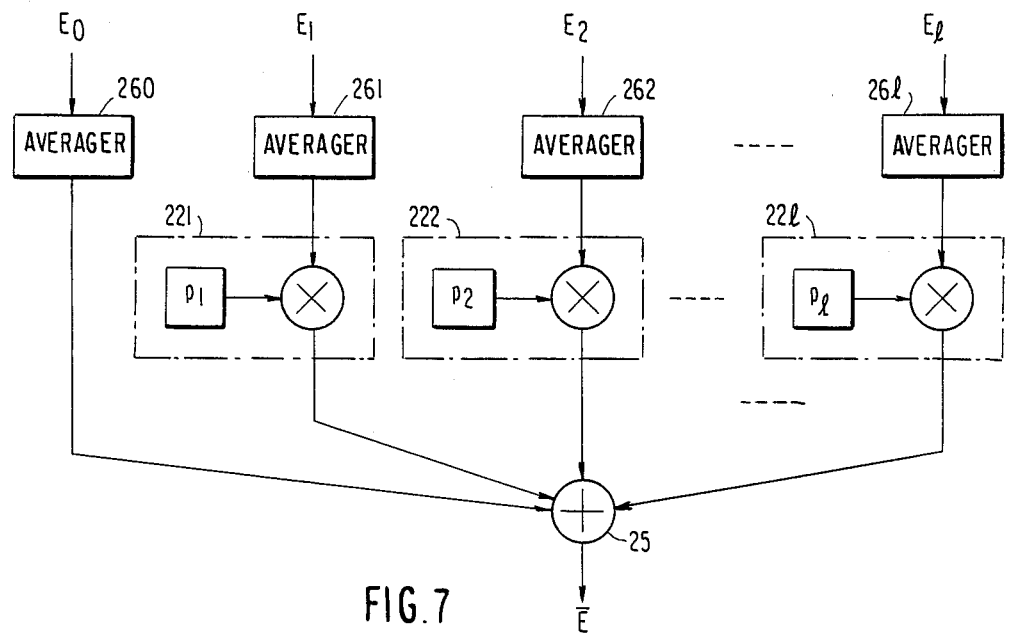
FIG. 7 is a block diagram view illustrating still another example of the calculator.

Referring to FIG. 7 showing another modification of the calculator 21, a plurality of (l+1) averagers 260 through 26l are used for averaging $E_0, E_1, E_2, \ldots,$ and $E_l$ to produce average values $\overline{E}_0, \overline{E}_1, \overline{E}_2, \ldots,$ and $\overline{E}_l$. Then, average values $\overline{E}_1, \overline{E}_2, \ldots,$ and $\overline{E}_l$ are multiplied by $p_1, p_2, \ldots,$ and $p_l$ at the weighing circuits 221 through 22l, respectively, which are thereafter added together with $\overline{E}_0$ to one another at adder 25 to produce means value $\overline{E}$.

Figure 8:
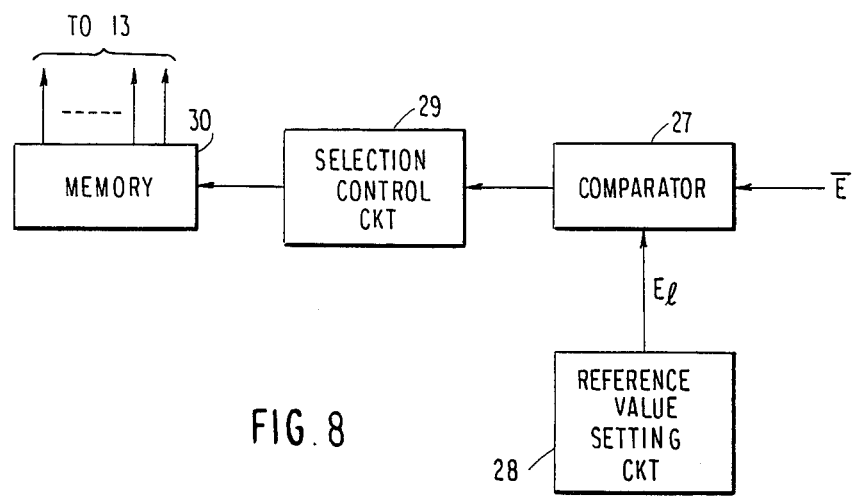
FIG. 8 is a block diagram view illustrating an example of a control circuit in FIG. 1.

Referring to FIG. 8, an example of the control circuit 15 comprises a comparator 27 for comparing the mean value $\overline{E}$ and the reference value $E_r$ to produce an error signal. The reference value $E_r$ is delivered from a reference value setting circuit 28. A selection control circuit 29 decides the error signal to produce a tap gain selection signal. A memory 30 stores a plurality of sets of values for tap gains of the transversal filter 11 which are predetermined dependent on values of the error signal to make the error zero or to make the calculated mean value $\overline{E}$ equal to the reference value $E_r$. Therefore, one set of values for the tap gains is selected by the selection signal and is applied to the multipliers 13 of the transversal filter 11 to control the tap gains. Thus, the transversal filter produces an equalized signal as the filter output.

As will be understood from the above-described embodiments, the automatic line equalizer according to the present invention can reliably provide an equalized signal even if the filter output is considerably distorted from the transmission signal at a start point.

Further, since all components of the automatic line equalizer can be formed by digital circuits, the automatic line equalizer can be easily contained on a single LSI chip of modest size.

What is claimed is:

1. In a digital automatic line equalizer for use in a receiving side of a digital signal transmitted through a transmission line in a digital communication system, comprising a transversal filter responsive to said digital signal for producing a filter output of sampled pulses, said transversal filter having a plurality of tap gains controlled by tap gain controlling means so as to produce an equalized signal as the filter output, the improvement of which comprises:

first multiplying means coupled to said transversal filter and responsive to the current filter output for squaring said current filter output to produce a first multiplied signal;

means coupled to said transversal filter for temporarily holding said filter output as a held signal;

second multiplying means coupled to said transversal filter output and said holding means and responsive to said current filter output for multiplying said held signal and the current filter output to produce a second multiplied signal;

calculating means coupled to said first and said second multiplying means for calculating from said first and said second multiplied signals a mean power of the sum of said first multiplied signal and said second multiplied signal weighted by weight to produce a mean power signal; and said tap gain controlling means coupled to said calculating means and responsive to said mean power signal for determining a set of values of said tap gains as a set of determined values on the base of said mean power signal to control the tap gains to be said set of determined values so that said transversal filter produces said equalized signal with the mean power being equal to a predetermined value.

2. A digital automatic line equalizer as claimed in claim 1, a partial response code signal being used as the digital signal in said digital communication system, which further comprises a partial response filter coupled with an input side of said transversal filter for filtering the digital signal to apply the partial respone code signal to said transversal filter.

3. A digital automatic line equalizer as claimed in claim 1, wherein said holding means comprises an l-stage (l being an integral number) shift register for time-sequentially shifting said sampled pulses of said filter output from one stage to next subsequent stage to temporarily hold subsequent l sampled pulses as said held signal, said subsequent l sampled pulses held in the l stages being delivered from the stages as a set of parallel signals, said second multiplying means comprising a plurality of (l) multipliers coupled to said l stages of said shift register, respectively, for multiplying said current filter signal and said parallel signals, respectively, to produce a set of l product signals as said second multiplied signal.

4. A digital automatic line equalizer as claimed in claim 3, wherein said calculating means comprises a plurality of (l) weighing circuits coupled to said l multipliers, respectively, for weighing predetermined weight factors said l product signals to form l weighed product signals, an adder coupled to said first multiplying means and said l weighing circuits for adding said first multiplied signal and said l weighed product signals together to produce an added signal, and an averaging circuit coupled to said adder for averaging said added signal for a predetermined time duration to produce said mean power signal.

5. A digital automatic line equalizer as claimed in claim 3, wherein said calculating means comprises a plurality of (l) weighing circuits coupled to said l multipliers, respectively, for weighing predetermined weight factors to said l product signals to form l weighed product signals, a plurality of (l+1) averaging circuits coupled to said first multiplying means and said l weighing circuits, respectively, for averaging said first multiplied signal and said weighed product signals for a predetermined time duration to produce a plurality of (l+1) averaged signals, respectively, and an adder coupled to said (l+1) averaging circuits for adding said (l+1) averaged signals together to produce said mean power signal.

6. A digital automatic line equalizer as claimed in claim 3, wherein said calculating means comprises an averaging circuit coupled to said first multiplying means for averaging said first multiplied signal for a predetermined time duration to produce an averaged signal, a pluraity of (l) averagers coupled to said l multipliers, respectively, for averaging said product signals for a predetermined time duration to produce a plurality of (l) average signals, a plurality of (l) weighing circuits coupled to said l averagers, respectively, for weighing predetermined weight factors to said l average signals to form l weighed average signals, and an adder coupled to said averaging circuit and said l weighing circuits for adding said averaged signal and said l weighed average signals together to produce said mean power signal.

7. A digital automatic line equalizer as claimed in claim 1, wherein said control means comprises a reference value setting means for storing said predetermined value as a reference value, comparing means responsive to said mean power signal for comparing said mean power signal and said reference value to produce an error signal, selection control means responsive to said error signal for producing a selection signal, and memory means for storing a plurality of sets of values for said tap gains, said memory means selecting, as said set of determined values, one set from said a plurality of sets of values in response to said selection signal to deliver said set of determined values to said transversal filter so as to control the tap gains.

* * * * *